T. L. GRAY.
GRADOMETER.
APPLICATION FILED OCT. 24, 1911.

1,052,050.

Patented Feb. 4, 1913.

Witnesses

Inventor
T. L. Gray
By
Attorney.

UNITED STATES PATENT OFFICE.

THOMAS L. GRAY, OF SAN FRANCISCO, CALIFORNIA.

GRADOMETER.

1,052,050.   Specification of Letters Patent.   Patented Feb. 4, 1913.

Application filed October 24, 1911. Serial No. 656,425.

*To all whom it may concern:*

Be it known that I, THOMAS L. GRAY, citizen of the United States, residing at San Francisco, in the county of San Francisco and State of California, have invented certain new and useful Improvements in Gradometers, of which the following is a specification.

My invention relates to instruments for measuring the dip, inclination or grade of a road, and more particularly it relates to a device adapted to be attached to a vehicle and readily observed by the driver thereof.

The primary object of my invention is the provision of a very simple, cheap and effective device of this character having very few parts and adapted to be attached to the dashboard of a vehicle, and to present to the observer, a dial having thereon a needle, the needle being so actuated as to show the angle of inclination or grade of the roadway.

A further object is to provide a device of this character which is very simple in construction and which therefore is not liable to get out of order, and in which the parts may be readily repaired or replaced when necessary.

Figure 1:
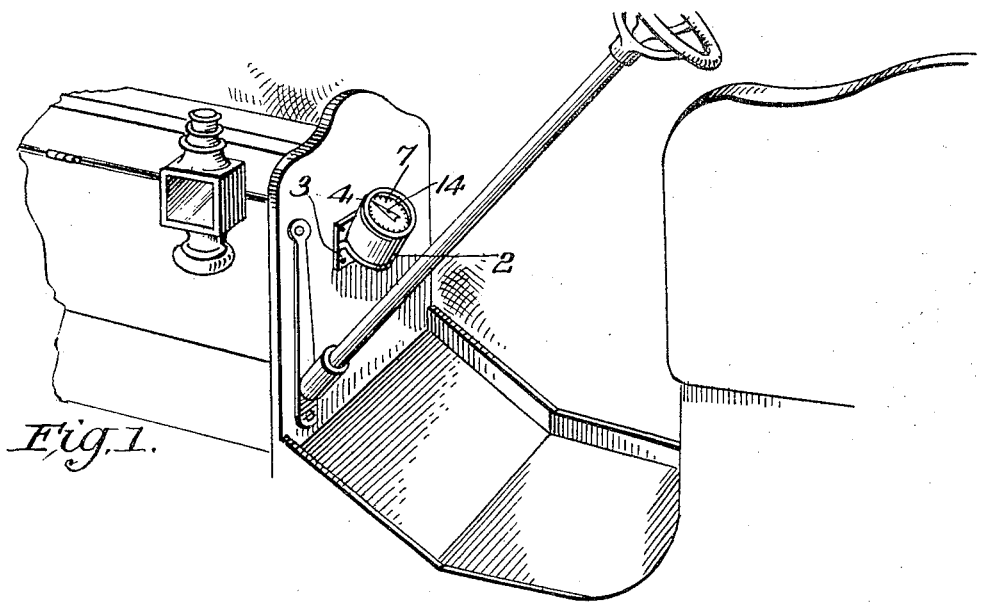
Figures 2, 3:
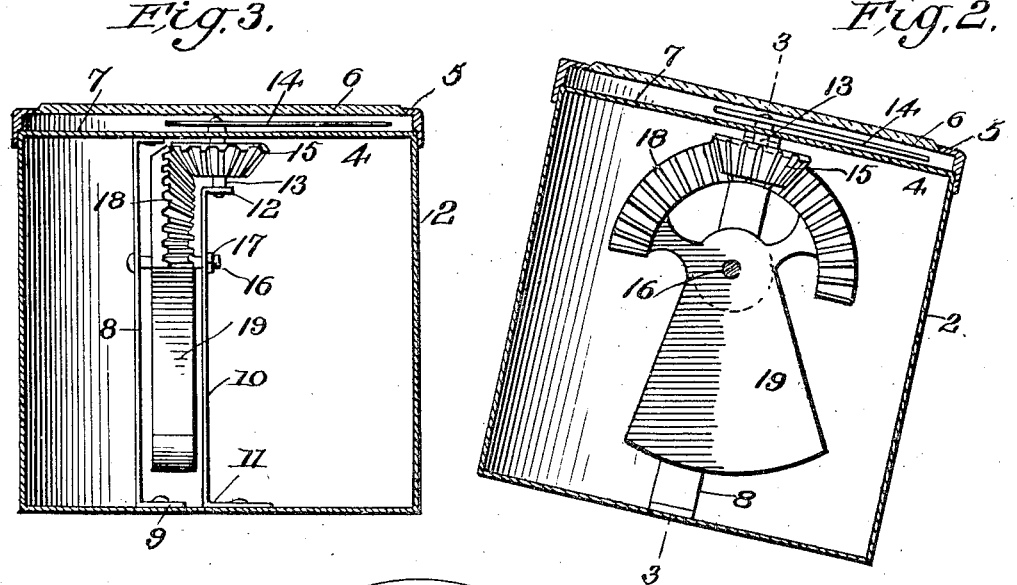
Figure 4:
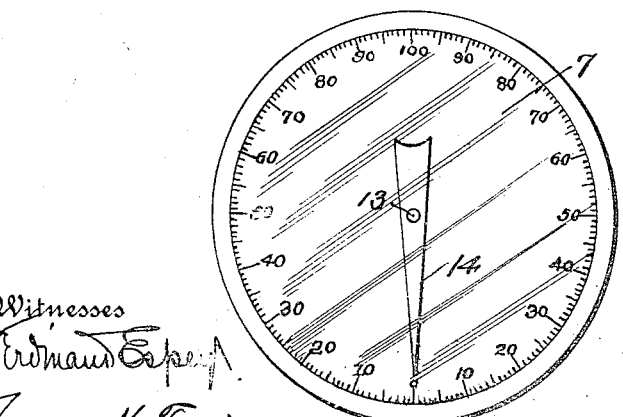

My invention is illustrated in the accompanying drawings wherein:

Figure 1 is a perspective view of a portion of an automobile showing my gradometer attached to the dashboard thereof. Fig. 2 is a vertical section through my improved gradometer. Fig. 3 is a section on the line 3—3 of Fig. 2. Fig. 4 is a face view of the dial.

Corresponding and like parts are referred to in the following description and indicated in all the views of the accompanying drawings by the same reference characters.

Referring to these figures, 2 designates a casing shown as circular but which may be of any suitable form and which is preferably made of metal, the casing having thereon any suitable means whereby it may be attached to the dashboard of a wagon but being shown as provided with outstanding attaching lugs 3 through which rivets, screws or other devices may pass to engage the dashboard. The casing 2 is divided into two portions by means of a horizontally disposed partition plate 4 which is disposed near the upper end of the casing. Fitting over the top of the casing is a cover 5 having downwardly extending marginal flanges and supporting a pane of glass 6. The partition plate 4 carries upon its outer face a dial 7 graduated in degrees.

Extending vertically through the casing 2 and assisting to support the dial plate or partition plate 4 is the vertically disposed partition plate 8 which is formed at its lower end with an angular flange 9 whereby it is attached to the bottom of the casing 2. Opposed to the partition plate 8 and extending parallel thereto is a supporting plate 10 flanged at its lower end as at 11, and attached by this flange to the bottom of the casing in any suitable manner. The upper end of this supporting member 10 is outwardly flanged or bent as at 12.

Rotatably supported in the flange 12 and passing through the partition plate 4 is a pointer shaft 13 carrying upon its upper end the pointer 14 whose extremity sweeps over the degree graduations marked upon the dial 7. Rigidly mounted upon the pointer shaft 13 is a bevel gear wheel 15 whereby the shaft is actuated.

Passing through the plates 8 and 10 is a pivot bolt 16 formed at one end with a head and at the other end screw threaded for engagement with a nut 17. Rotatably mounted upon this pivot bolt is a toothed sector 18 whose teeth mesh with the teeth of the bevel gear wheel 15. Formed preferably integral with the sector is the radially extending weight 19. The weight is wider at its outer end than at its inner end, and the end of the weight is preferably curved.

The operation of my invention is obvious. It will be obvious that when the weight 19 is in a vertical position, the pointer 14 will be at zero upon the graduated scale, and that as the casing is inclined from the vertical the relative movement of the weight will cause a rotation of the rear wheel 15 and a corresponding sweep of the pointer over the scale, and that the pointer will correctly indicate upon the scale the degree of inclination of the casing relative to the vertical and inasmuch as the bottom of the casing will be approximately parallel to the road, the pointer will indicate the grade of the road. By reference to Fig. 4, it will be seen that the dial is graduated in both directions marked from zero to 90° so that the device will operate not only in climbing a hill, but also in going down a hill to show the inclination of the grade.

My device is particularly useful for automobiles and other self-propelled vehicles as it indicates to the driver precisely what grade he is climbing or descending, and thus permits him to see how his car is working, and permits him also to compare the hill climbing ability at one time with the hill climbing ability of the car at some other period.

While I preferably mount my gradometer upon the dashboard of a vehicle so that the dial is face upward where it may be readily observed by the driver, yet it is obvious that it might be attached to other portions of the vehicle, and that it may be placed either in a horizontal or vertical position, or at any angle preferred by changing the weight upon the bottom of the sector.

I have found my device in practice to be extremely convenient and effective, and it may be used in a variety of circumstances. It is particularly convenient for indicating grades for automobile map making.

It is obvious that the casing might be changed in any way without departing from the spirit of the invention so as to make the casing conform to various types of vehicle.

What I claim is:

1. A gradometer comprising a casing, a dial plate extending over the upper portion of the casing, strips extending from the bottom to the under side of the dial plate, said strips being spaced from each other and being parallel, one of said strips having angular terminal ends bearing against the bottom and the under side of the dial plate, the other strip being shorter and having an angular terminal upper end, a pivot bolt passing through said supporting strips, a weighted sector gear pivoted on said bolt, a shaft supported on the upper terminal end of the shorter strip and passing up through the dial plate, a bevel gear wheel on said shaft engaging the sector gear, and a pointer on the shaft above the dial plate.

2. A gradometer comprising a casing, a dial plate extending over the upper portion of the casing, strips extending from the bottom to the under side of the dial plate, said strips being spaced from each other and being parallel, one of said strips having angular terminal ends bearing against the bottom and the under side of the dial plate, the other strip being shorter and having an angular terminal upper end, a pivot bolt passing through said supporting strips, a weighted sector gear pivoted on said bolt, a shaft supported on the upper terminal end of the shorter strip and passing up through the dial plate, a bevel gear wheel on said shaft engaging the sector gear, a pointer on the shaft above the dial plate, and a transparent cover closing the upper end of the casing and being removable.

In testimony whereof I affix my signature in presence of two witnesses.

THOMAS L. GRAY. [L. S.]

Witnesses:
 LOUISE M. GUNN,
 G. R. GUNN.